United States Patent
Phan et al.

(10) Patent No.: US 10,065,726 B1
(45) Date of Patent: Sep. 4, 2018

(54) UNMANNED AERIAL VEHICLES WITH MULTIPLE CONFIGURATIONS

(71) Applicant: Top Flight Technologies, Malden, MA (US)

(72) Inventors: Long N. Phan, Somerville, MA (US); Anandrao Biradar, Somerville, MA (US); Luan H. Duong, Boston, MA (US); Samir Nayfeh, Shrewsbury, MA (US)

(73) Assignee: Top Flight Technologies, Inc., Malden, MA (US)

( * ) Notice: Subject to any disclaimer, the term of this patent is extended or adjusted under 35 U.S.C. 154(b) by 104 days.

(21) Appl. No.: 15/593,803

(22) Filed: May 12, 2017

Related U.S. Application Data

(60) Provisional application No. 62/394,861, filed on Sep. 15, 2016, provisional application No. 62/335,938, filed on May 13, 2016.

(51) Int. Cl.
| | |
|---|---|
| *B64C 27/00* | (2006.01) |
| *B64C 1/06* | (2006.01) |
| *B64C 39/02* | (2006.01) |
| *B64D 17/80* | (2006.01) |
| *B64C 27/08* | (2006.01) |

(52) U.S. Cl.
CPC .............. *B64C 1/063* (2013.01); *B64C 27/08* (2013.01); *B64C 39/024* (2013.01); *B64D 17/80* (2013.01); *B64C 2201/024* (2013.01); *B64C 2201/042* (2013.01); *B64C 2201/082* (2013.01); *B64C 2201/127* (2013.01); *B64C 2201/146* (2013.01); *B64C 2201/201* (2013.01); *B64C 2201/206* (2013.01)

(58) Field of Classification Search
CPC ............ B64C 39/026; B64C 2201/024; B64C 2201/042; B64C 2201/082; B64C 2201/102; B64C 2201/108; B64C 2201/165; B64C 2201/201
See application file for complete search history.

(56) References Cited

U.S. PATENT DOCUMENTS

| | | | |
|---|---|---|---|
| 3,053,480 A | 9/1962 | Vanderlip | |
| 3,937,424 A * | 2/1976 | Meier | B64D 27/24 244/53 R |
| 8,052,081 B2 * | 11/2011 | Olm | B64C 39/024 244/17.23 |
| 8,089,034 B2 | 1/2012 | Hammerquist | |
| 8,191,831 B2 | 6/2012 | Nadir | |
| 8,292,215 B2 * | 10/2012 | Olm | B64C 39/024 244/17.23 |
| 2008/0184906 A1 | 8/2008 | Kejha | |
| 2010/0108801 A1* | 5/2010 | Olm | B64C 39/024 244/17.23 |
| 2012/0056041 A1 | 3/2012 | Rhee et al. | |

(Continued)

OTHER PUBLICATIONS

International Search Report and Written Opinion for App. Ser. No. PCT/US17/32363, dated Aug. 14, 2017, 9 pages.

*Primary Examiner* — Philip J Bonzell
(74) *Attorney, Agent, or Firm* — Fish & Richardson P.C.

(57) ABSTRACT

An unmanned aerial vehicle includes multiple rotor arms; a rotor disposed at an end of each of the multiple rotor arms; and an adjustment component configured to enable a first rotor arm to move relative to a second rotor arm.

26 Claims, 11 Drawing Sheets

(56) References Cited

U.S. PATENT DOCUMENTS

| | | | |
|---|---|---|---|
| 2012/0138732 A1* | 6/2012 | Olm | B64C 39/024 |
| | | | 244/17.23 |
| 2013/0105635 A1 | 5/2013 | Alzu'bi et al. | |
| 2013/0146716 A1 | 6/2013 | Gettinger | |
| 2015/0321755 A1 | 11/2015 | Martin et al. | |
| 2016/0046372 A1* | 2/2016 | Barnes | B64C 39/024 |
| | | | 244/17.19 |
| 2016/0070264 A1 | 3/2016 | Hu et al. | |
| 2016/0122016 A1 | 5/2016 | Mintchev et al. | |
| 2016/0137304 A1 | 5/2016 | Phan et al. | |
| 2016/0159471 A1* | 6/2016 | Chan | B64C 39/024 |
| | | | 244/39 |
| 2016/0159472 A1* | 6/2016 | Chan | B64C 27/08 |
| | | | 244/39 |
| 2016/0304199 A1* | 10/2016 | Chan | B64C 39/024 |
| 2017/0225781 A1* | 8/2017 | Almasoud | B64C 39/024 |

* cited by examiner

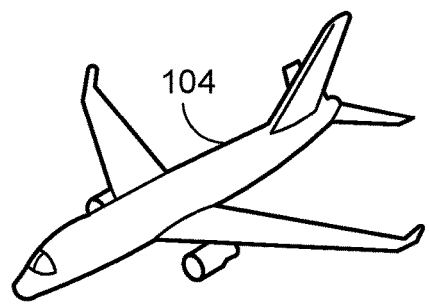
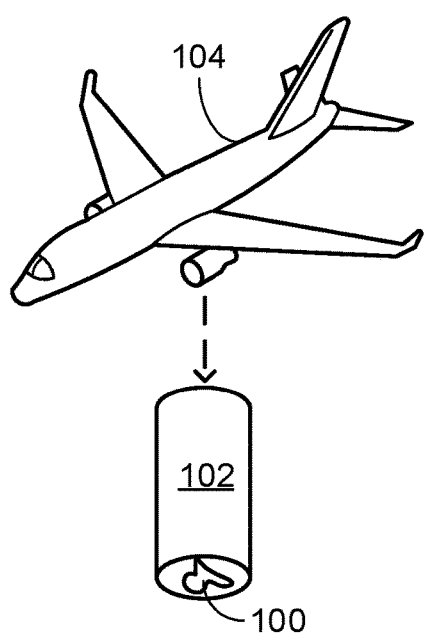
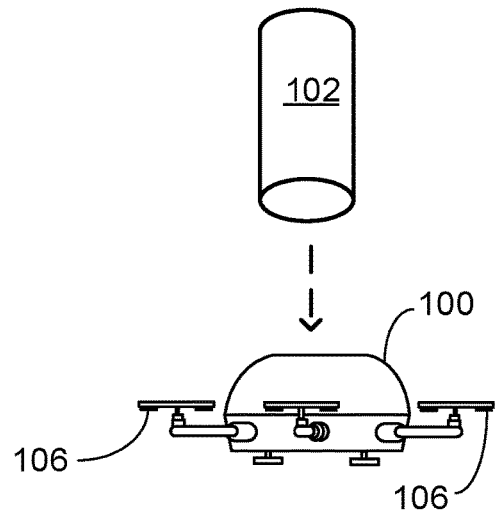
FIG. 1A
FIG. 1B

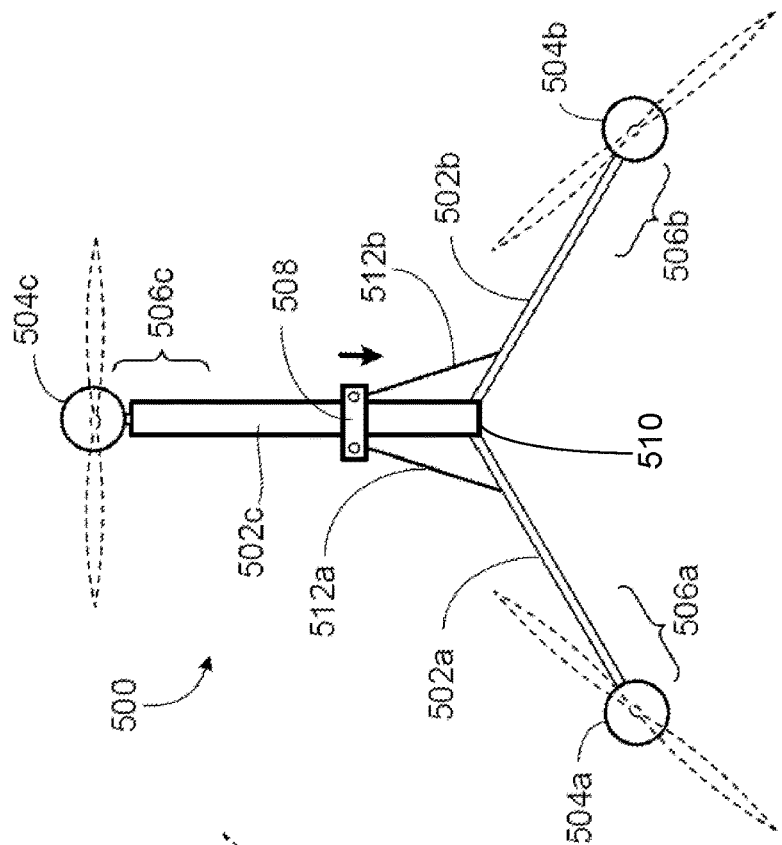
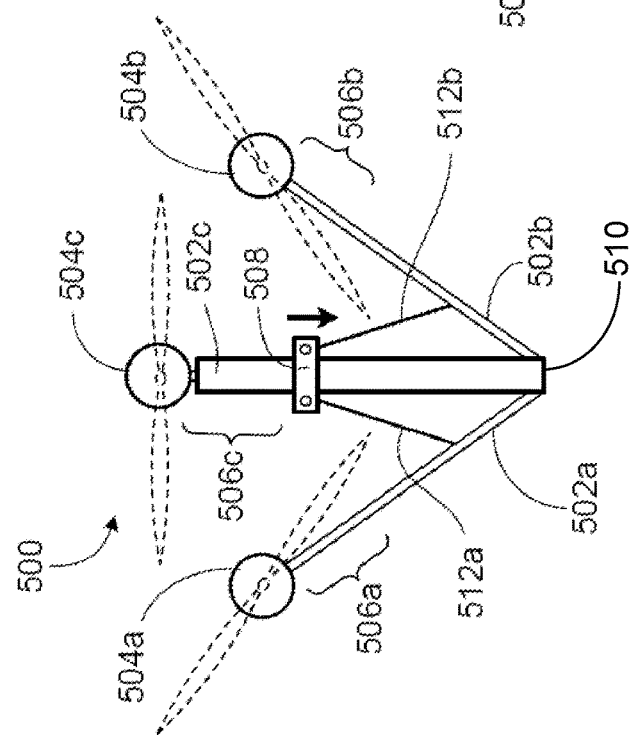
FIG. 5B
FIG. 5A

UNMANNED AERIAL VEHICLES WITH MULTIPLE CONFIGURATIONS

CLAIM OF PRIORITY

This application claims priority to U.S. Patent Application Ser. No. 62/394,861, filed Sep. 15, 2016, and to U.S. Patent Application Ser. No. 62/335,938, filed May 13, 2016, the contents of both of which are incorporated here by reference in their entirety.

BACKGROUND

A multi-rotor unmanned aerial vehicle (UAV) may include rotor motors, one or more propellers coupled to each rotor motor, electronic speed controllers, a flight control system (auto pilot), a remote control (RC) radio control, a frame, and a battery, such as a lithium polymer (LiPo) or similar type rechargeable battery. Multi-rotor UAVs can perform vertical take-off and landing (VTOL) and are capable of aerial controls with similar maneuverability to single rotor aerial vehicles.

SUMMARY

In an aspect, an unmanned aerial vehicle includes multiple rotor arms; a rotor disposed at an end of each of the multiple rotor arms; and an adjustment component configured to enable a first rotor arm to move relative to a second rotor arm.

Embodiments can include one or more of the following features.

The adjustment component is configured to enable the unmanned aerial vehicle to take on an open configuration or a closed configuration. In the closed configuration, an angle between adjacent rotor arms is less than 30°. In the closed configuration, at least two of the rotor arms are positioned such that the rotors disposed at the ends of the at least two rotor arms do not have sufficient space to rotate propellers attached to the rotors. In the closed configuration, the multiple rotor arms are oriented parallel to each other. In the open configuration, the multiple rotor arms are extended away from each other. In the open configuration, an angle between adjacent rotor arms is greater than 85°, greater than 100°, or greater than 120°. In the closed configuration, the unmanned aerial vehicle is sized to fit into a volume of less than about 1000 cm³. In the closed configuration, the unmanned aerial vehicle is sized to fit into a National Center for Atmospheric Research (NCAR) dropsonde.

The first rotor arm is attached to the adjustment component, and in which the adjustment component comprises a bar configured to slide along the second rotor arm.

The adjustment component comprises an actuator mechanism configured to push the first rotor arm away from the second rotor arm.

The adjustment component comprises a joint formed in the first rotor arm.

The adjustment component comprises a pivot point and in which the first rotor arm is configured to pivot around the pivot point.

The unmanned aerial vehicle includes a tilt mechanism configured to control angular and translational velocity of the unmanned aerial vehicle. The tilt mechanism is positioned at the end of one of the multiple rotor arms.

The unmanned aerial vehicle includes a power source configured to provide power to a rotor motor coupled to one or more of the rotors. The power source comprises a battery.

The battery is disposed on one of the rotor arms. The battery forms part of one of the rotor arms. The power source comprises a hybrid generator system.

The actuator mechanism can be configured to detach from the adjustment component when the unmanned aerial vehicle takes on an open configuration.

The actuator mechanism includes one or more of a torsion spring, an extension spring, a motor and screw, a motor and gearbox, a pneumatic device, a chemical reaction, and a parachute attachment.

The actuator mechanism includes a portion of one or more of the multiple rotor arms.

BRIEF DESCRIPTION OF THE DRAWINGS

FIG. 1A is a diagram of an unmanned aerial vehicle (UAV) in a canister.
FIG. 1B is a diagram of a UAV deployed from a canister.
FIGS. 4A, 4B, 5A, 5B, 6A, 6B, 7A, 7B, 8A and 8B are diagrams of UAVs.

DETAILED DESCRIPTION

We describe here an unmanned aerial vehicle (UAV) that can be arranged in multiple configurations. In a closed configuration, the UAV is collapsed or closed into a small unit that can be contained within the interior of a canister. In an open configuration, the UAV is opened into a form that is capable of flight, for instance, as a multirotor UAV or fixed wing UAV. For instance, the UAV in its closed configuration can be fit into a National Center for Atmospheric Research (NCAR) dropsonde. The UAV can be released from the dropsonde and opened to collect environmental measurements, such as weather readings from the interior of a hurricane.

Referring to FIG. 1A, a UAV 100 is contained in a hollow space within a canister 102. The UAV 100 can be a multi-rotor system or a fixed wing vehicle that can be arranged in multiple configurations: a closed configuration in which the UAV 100 is collapsed or closed into a small unit, e.g., a unit that fits into the small volume within the canister, and an open configuration in which the UAV 100 is opened into a form that is capable of flight. The canister 102 can be, for instance, a National Center for Atmospheric Research (NCAR) dropsonde that is designed to be released from an aircraft 104 to collect environmental (e.g., weather) measurements.

Referring to FIG. 1B, when the canister 102 is released from the aircraft 104, the UAV 100 is ejected from the canister 102 and automatically deployed into its open configuration in which the UAV 100 is able to fly. For instance, in the open configuration for a multirotor UAV (such as the UAV 100), multiple rotors 106 are positioned to generate lift that enables the UAV 100 to fly. In the open configuration for a fixed wing UAV (not shown), the wings are disposed in an orientation to generate lift that enables the UAV to fly.

The UAV in its open configuration can navigate, e.g., according to a previously programmed route or according to remote control. The UAV can include sensors associated with the tasks to be performed by the UAV. The UAV can include communications hardware, such as a transmitter, a receiver, or both a transmitter and a receiver (e.g., a transceiver). The communications hardware can be used to return data, such as during performance of a task, to a remote device, such as a controller. The communications hardware can coordinate tasks (e.g., mission tasks) to be performed with one or more remote devices, such as during a task being performed by the UAV. In an example, a UAV deployed from an NCAR dropsonde into a hurricane can include temperature, pressure, and humidity sensors, and can be programmed to collect weather data as a function of both altitude and lateral position within the hurricane. In an example, a UAV deployed by a spy plane can include cameras and can be programmed to fly to a point of interest to obtain surveillance photos of an intelligence target.

Figure 2:
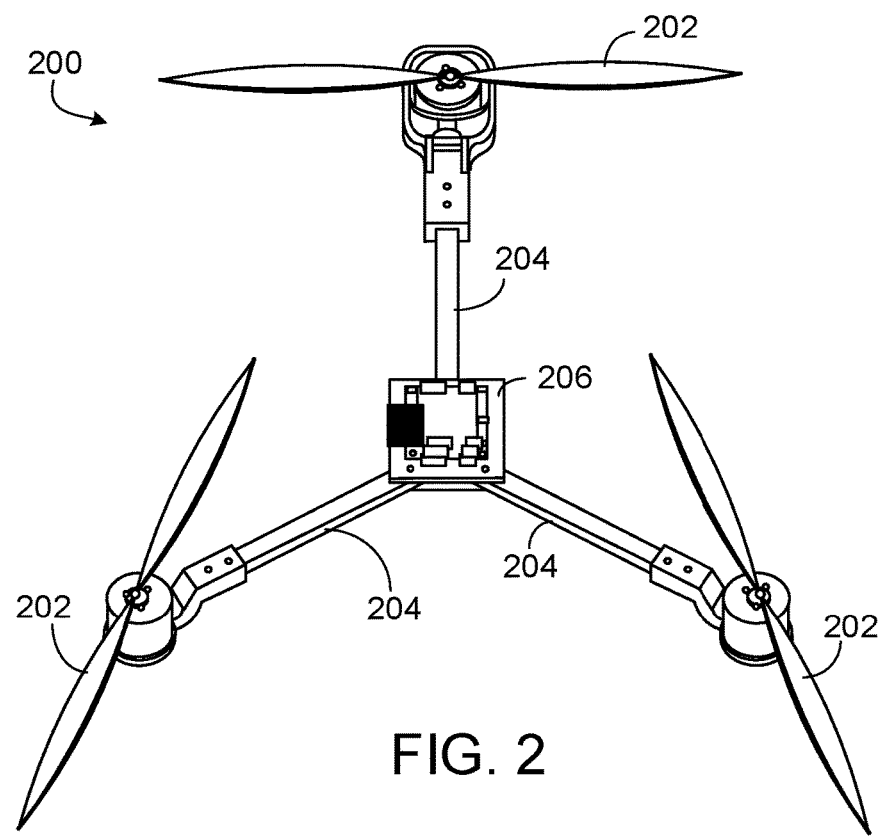
FIG. 2 is a diagram of a UAV.

Referring to FIG. 2, an example UAV 200 is a multirotor UAV having three rotors 202, each rotor mounted on the end of a corresponding rotor arm 204. The rotor arms 204 are connected to a central portion 206. In some examples, a multirotor UAV can have a different number of rotors, such as two, four, five, six, or another number of rotors. The UAV 200 can be arranged in a closed configuration, e.g., to fit into a canister, or an open configuration, e.g., to fly or perform mission tasks.

A propeller can be connected to each rotor 202 such that rotation of each propeller is controlled by the corresponding rotor 202. In some examples, when the UAV 200 is in a closed configuration, two or more of the rotor arms 204 are positioned close together such that there is not sufficient space for the propellers on the ends of those rotor arms 204 to rotate. When the UAV 200 is in an open configuration, the rotor arms 204 are spaced apart such that there is sufficient space for all of the propellers to rotate.

The central portion 206 of the UAV 200 can house flight systems, such as avionics systems or navigational systems. Avionics systems can include autopilot functionalities capable of monitoring and controlling flight parameters of the UAV 200, such as altitude, orientation, speed, or other flight parameters. In some examples, the navigational systems can include a Global Positioning Service (GPS) system that can control the UAV to navigate to a destination or to execute a preplanned waypoint mission. For instance, the navigational systems can access information about a destination or preplanned mission stored in an onboard data storage unit. In some examples, navigation of the UAV 200 is controlled remotely, and the navigational systems can include remote control communications components for receiving navigational commands and/or for transmitting information about the location of the UAV 200 or information gathered by the sensors carried by the UAV. The central portion 206 of the UAV 200 can house other systems or devices, such as sensors, cameras, processors, data storage components, communications components, or other systems or devices. In some examples, one or more systems or devices can be housed elsewhere on the UAV 200, such as along a rotor arm 204 or at the end of a rotor arm 204.

Figure 3:
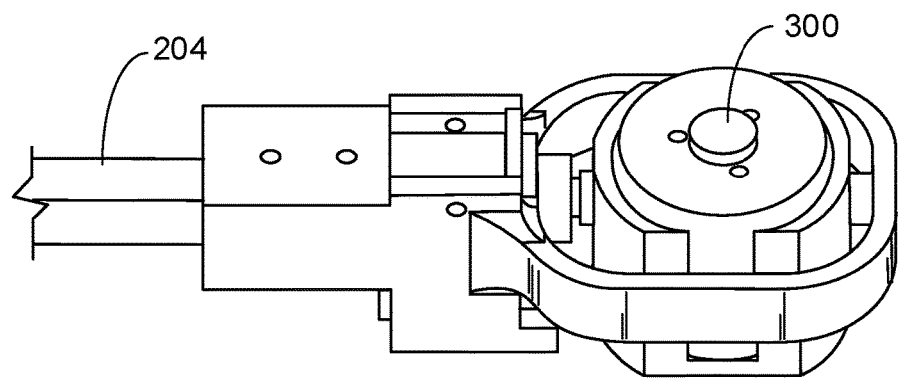
FIG. 3 is a diagram of a tilt mechanism of a UAV.

In some examples, when the UAV 200 transitions from its closed configuration to its open configuration while airborne, maintaining the UAV 200 in a desired orientation, such as an upright orientation, can be challenging. Referring to FIG. 3, a tilt mechanism 300 can control the tilt or orientation of the UAV 200, e.g., by providing torque balancing. The tilt mechanism can be controlled by autopilot and can be tilt actuated to counter the torque imbalance generated by one or more of the rotor motors of the UAV 200. For instance, the tilt mechanism can have the ability to control the angular velocity of the UAV 200, the translational velocity of the UAV 200, or both. The tilt mechanism can be positioned at the end of one or more of the rotor arms 204 of the UAV 200. In some examples, a single tilt mechanism is sufficient to control the tilt or orientation of the UAV 200. In some examples, multiple tilt mechanisms can be provided. In some examples, the tilt mechanism can be powered by the same energy source, such as a battery, that powers one or more of the rotor motors. In some examples, the tilt mechanism can be powered by a dedicated energy source, or by an energy source that powers other components or systems of the UAV.

FIGS. 4A, 4B, 5A, 5B, 6A, 6B, 7A, 7B, 8A, and 8B show various examples of UAVs. The UAVs are able to take on a closed configuration that is small enough to fit into a small volume, such as a volume of between about 500 cm$^3$ and about 10,000 cm$^3$, such as about 500 cm$^3$, about 1000 cm$^3$, about 2000 cm$^3$, about 4000 cm$^3$, about 6000 cm$^3$, about 8000 cm$^3$, about 10,000 cm$^3$, or another volume. The UAVs are also able to take on an open configuration in which the UAV is stable and capable of flight.

Figure 4B:
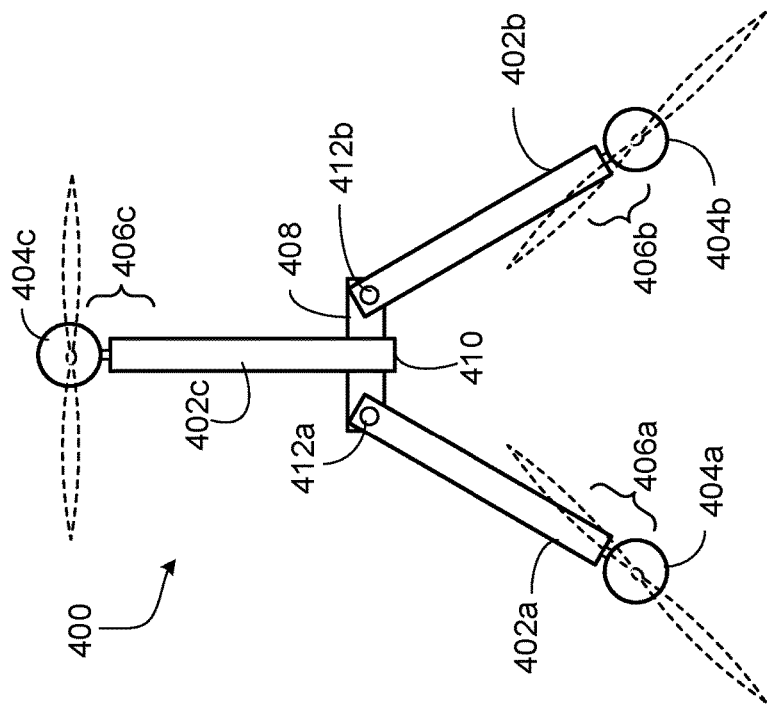
Figure 4A:
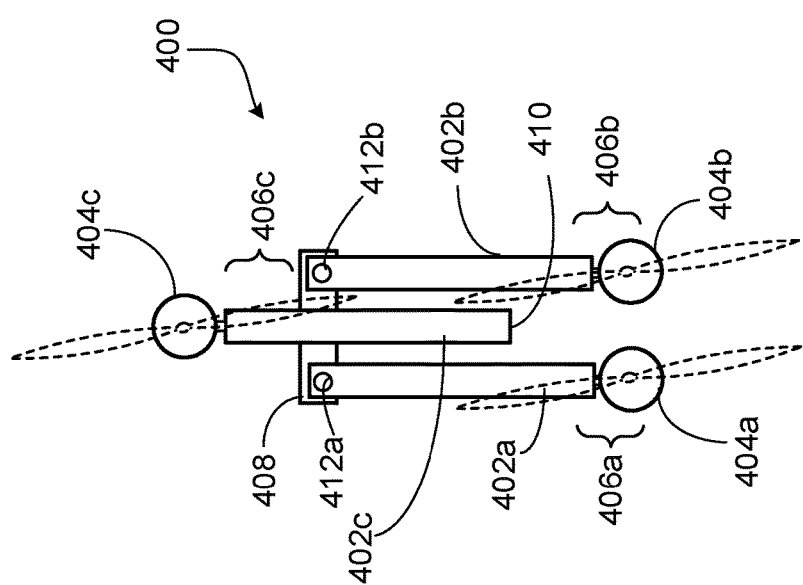

Referring to FIGS. 4A and 4B, an example UAV 400 with three rotor arms 402a, 402b, 402c has a closed configuration (FIG. 4A) and an open configuration (FIG. 4B). Each rotor arm 402a, 402b, 402c has a rotor 404a, 404b, 404c mounted on an end 406a, 406b, 406c of the arm, sometimes referred to as the rotor end of the arm. A bar 408 is slidably attached to the third rotor arm 402c. Each of the other two rotor arms 402a, 402b is attached to the bar 408 by a connection that allows the rotor arm 402a, 402b to rotate around the point of attachment to the bar 408.

In the closed configuration (FIG. 4A), the bar 408 is positioned towards the rotor end 406c of the rotor arm 402c. The rotor arms 402a, 402b are oriented substantially parallel to the rotor arm 402c and point away from the rotor end 406c of the rotor arm 402c. In this configuration, the UAV 400 has an elongated shape such that the UAV 400 can fit into a narrow, elongated canister.

To open the UAV 400 into its open configuration (FIG. 4B), the bar 408 slides along the rotor arm 402c towards an opposite end 410 of the rotor arm 402c. In some examples, the bar 408 is attached to the rotor arm 402c by a protrusion that slides along a corresponding track running along the length of the rotor arm 402c. In some examples, a hole is formed through the thickness of the bar 408 and the rotor arm 402c is inserted through the hole, and the bar 408 can move along the length of the rotor arm 402c. A locking mechanism (not shown) can hold the bar 408 in place at the end 410 of the rotor arm 402c. In some examples, the bar 408 can slide past a one-way latch disposed near the end 410 of the rotor arm 402c that prevents the bar 408 from sliding back towards the rotor end 406c of the rotor arm 402c. In some examples, a spring loaded push mechanism can engage the rotor arm 402c, thus locking the rotor arm 402c in its desired position. In some examples, the rotor arm 402c can be a spring loaded ratchet arm that provides a one-way engagement mechanism to lock the bar 408 in position.

In addition, to open the UAV 400 into the open configuration, the rotor arms 402a, 402b rotate outwards (e.g., away from the rotor arm 402c) around pivot points 412a, 412b on the bar 408. For instance, for the UAV 400 with three rotor arms, the rotor arms 402a, 402b are rotated until the angle between each pair of adjacent arms is approximately the same, such as about 120°. In some examples, the angles between pairs of adjacent arms are not all the same. For instance, the angle between one pair of arms can be at least about 85°, at least about 100°, or another angle, and the angles between the other two pair of arms can be equal.

In some examples, the rotation of the rotor arms 402a, 402b occurs concurrently with the sliding of the bar 408 along the rotor arm 402c. In some examples, the rotation of the rotor arms 402a, 402b occurs before the bar 408 slides along the rotor arm 402c, or vice versa. A locking mechanism (not shown) can hold the rotor arms 402a, 402b in the open position. For instance, the rotor arms 402a, 402b can be attached to the bar 408 by a ratchet connection that allows the rotor arms 402a, 402b to rotate outwards but not inwards. In some examples, a stop mechanism (not shown), such as a pin, can prevent the rotor arms 402a, 402b from rotating beyond a certain point. For instance, the stop mechanism can prevent each rotor arm 402a, 402b from rotating outward more than 50°, more than 60°, more than 70°, or another amount beyond the closed position. In some examples, a mechanical folding link positioned between the two rotor arms 402a, 402b can lock the rotor arms 402a, 402b at a desired angle. The link can straighten during or after the opening of the UAV 400, for instance, responsive to a spring actuation.

Referring to FIGS. 5A and 5B, an example UAV 500 with three rotor arms 502a, 502b, 502c has a closed configuration (FIG. 5A) and an open configuration (FIG. 5B). Each rotor arm 502a, 502b, 502c has a rotor 504a, 504b, 504c mounted on an end 506a, 506b, 506c of the arm, sometimes referred to as the rotor end of the arm. The rotor arms 502a, 502b, 502c are joined at their ends 510. A bar 508 is slidably attached to the third rotor arm 502c.

Each of the other two rotor arms 502a, 502b is connected to the bar 508 by rigid links 512a, 512b, respectively, that each pushes open the rotor arms 502a, 502b when bar 508 is driven along rotor arm 502c by an actuator (not shown).

In the closed configuration (FIG. 5A), the bar 508 is positioned towards the rotor end 506c of the rotor arm 502c. The rotor arms 502a, 502b are rotated upwards towards the rotor end 506c of the rotor arm 502c. For instance, the angle between each rotor arm 502a, 502b and the rotor arm 502c can be about 45° or less, such as about 45°, about 30°, about 15°, or another angle. In this configuration, the UAV 500 has an elongated shape such that the UAV 500 can fit into a narrow, elongated canister.

To open the UAV 500 into the open configuration (FIG. 5B), the bar 508 slides along the rotor arm 502c towards the opposite end 510 of the rotor arm 502c, e.g., as described above for the bar 408 of FIGS. 4A and 4B. A locking mechanism can hold the bar in place at the end 510 of the rotor arm 502c.

The bar 508 can be driven along the rotor arm 502c using an actuator mechanism (not shown). The actuator mechanism can exert a force on the bar 508 to drive the bar down the rotor arm 502c. The actuator mechanism can be triggered when desired to open the UAV 500 to the open configuration (FIG. 5B), such as when the UAV exits the dropsonde. For instance, when the UAV 500 is in the closed configuration, the actuator mechanism can be compressed, thus storing a potential energy. When the UAV exits the dropsonde, the actuator mechanism can decompress into a relaxed state, thus opening the UAV 500. In some examples, the actuator mechanism includes a spring, such as a torsional spring, an extensional spring, or another type of spring. In some examples, the actuator mechanism includes an electromechanical system, such as a motor and screw system, a motor and gearbox, or another type of electromechanical system. In some examples, the actuator mechanism includes compressed gas, hydraulics, or chemicals that can expand quickly to force open the rotor arms 502a, 502b. Is some examples, a parachute attachment (described below in relation to FIGS. 9A-9D) can be used as an actuator mechanism to open the UAV 500 to the open configuration. In some examples, the rotors 502a, 502b can include an actuator mechanism that forces the rotor arms open. For instance, the rotor arms 502a, 502b can include a mechanical mechanism that forces the rotor arms 502a, 502b away from the rotor arm 502c.

The actuator mechanism can be a modular attachment to the UAV 500. The actuator mechanism can remain attached to the UAV 500 once the UAV is deployed to the open configuration. Alternatively, the actuator mechanism can detach from the UAV 500 after the UAV has been opened into the open configuration. For instance, after the UAV 500 is open, the actuator mechanism can be ejected, dropped, released, or otherwise detached from the UAV. Detaching the actuator mechanism can decrease the weight of the UAV and assist in increasing flight time.

In addition, the rigid links 512a, 512b are pushed by the bar 508, pushing the rotor arms 502a, 502b away from the rotor arm 502c and rotating the rotor arms 502a, 502b around the end 510 of the rotor arm 502c into their open position. The rigid links 512a, 512b can be affixed to the bar 508 using a pivot joint, such that the rigid links can pivot to different angles relative to the rotor arm 502c. The rigid links 512a, 512b can be affixed to the rotor arms 502a, 502b using pivot joints, such that the rigid links can pivot to different angles relative to the rotor arms 502a, 502b. For instance, for the UAV 500 with three rotor arms, the rotor arms 502a, 502b are rotated until the angle between each pair of adjacent arms is approximately the same, such as about 120°. A locking mechanism can hold bar 508 near the end 510 of the rotor arm 502c, maintaining the rotor arms 502a, 502b in the open position.

In some examples, each actuator 512 shown in FIGS. 5A and 5B can be replaced by a rigid attachment mechanism connecting the corresponding rotor arm 502a, 502b to the bar 508. Each rigid attachment mechanism can be slidably connected to the corresponding rotor arm 502a, 502b. To rotate the rotor arms 502a, 502b away from the rotor arm 502c into their open position, the attachment mechanisms can slide along the corresponding rotor arm 502a, 502b towards the rotor end 506a, 506b. Because the attachment mechanism is rigid and cannot elongate, the sliding of the attachment mechanism pushes the rotor arms 502a, 502b away from the rotor arm 502c, causing the rotor arms 502a, 502b to rotate around their ends 510 and into their open position.

Figure 6A:
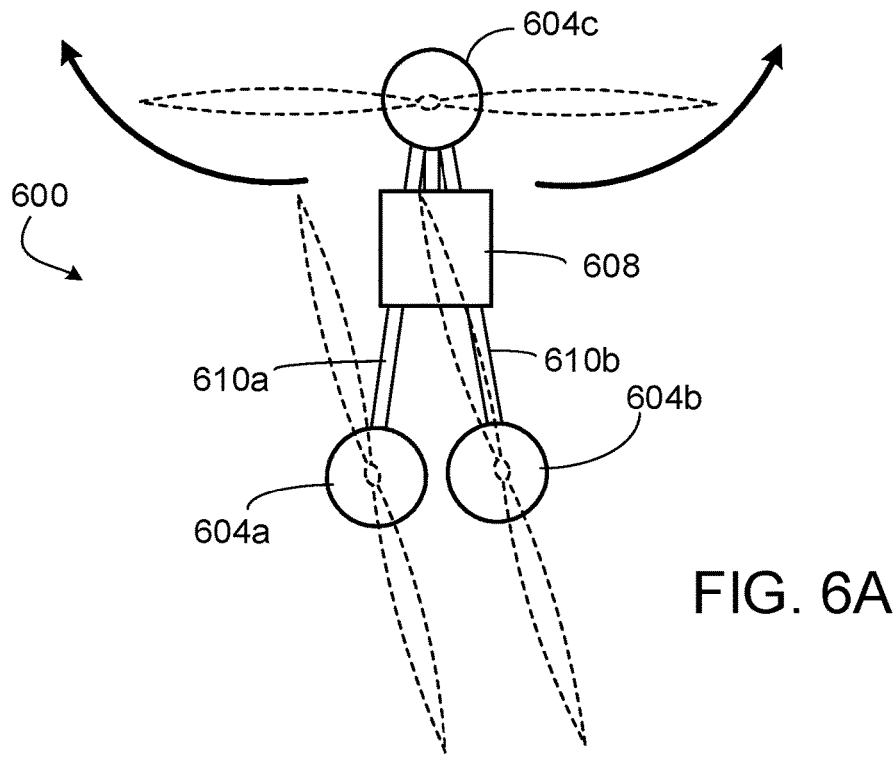
Figure 6B:
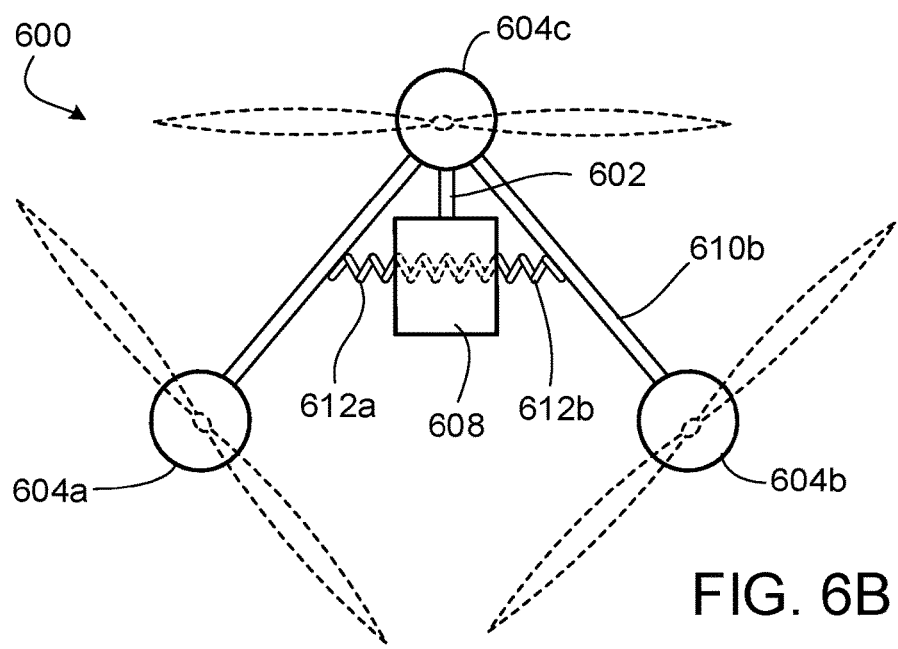

Referring to FIGS. 6A and 6B, an example UAV 600 with three rotors 604a, 604b, 604c has a closed configuration (FIG. 6A) and an open configuration (FIG. 6B). The rotor 604c is mounted at an end 606 (sometimes called the rotor end) of a central arm 602. The other end of the central arm 602 is connected to a support component 608. Two rotor arms 610a, 610b are fixed to the rotor end 606 of the central arm 602, and each rotor 604a, 604b is mounted at the opposite end of a corresponding one of the rotor arms 610a, 610b. A central portion of each rotor arm 610a, 610b is connected to the support component 608 by a corresponding actuator 612a, 612b that elongates upon actuation.

In the closed configuration (FIG. 6A), the actuators 612 are retracted, which causes the rotor arms 610a, 610b to be held close to the support component 608. In this configuration, the angle between each rotor arm 610a, 610b and the central arm 602 can be about 30° or less, such as about 30°, about 20°, about 10°, or another angle. In this configuration, the UAV 600 has an elongated shape such that the UAV 600 can fit into a narrow, elongated canister.

To open the UAV 600 into its open configuration (FIG. 6B), the actuators 612 are elongated, pushing the rotor arms 610a, 610b away from the support component 608. The rotor arms 610a, 610b remain fixed at the rotor end 606 of the central arm 602 and rotate around the rotor end 606 of the central arm 602 into their open position. For instance, for the UAV 600 with three rotors, the rotor arms 610a, 610b are rotated until the angle between each rotor arm 610a, 610b and the central arm 602 is about 60°. A locking mechanism can hold the actuators 612 in their elongated state, maintaining the rotor arms 610a, 610b in the open position.

Figure 7B:
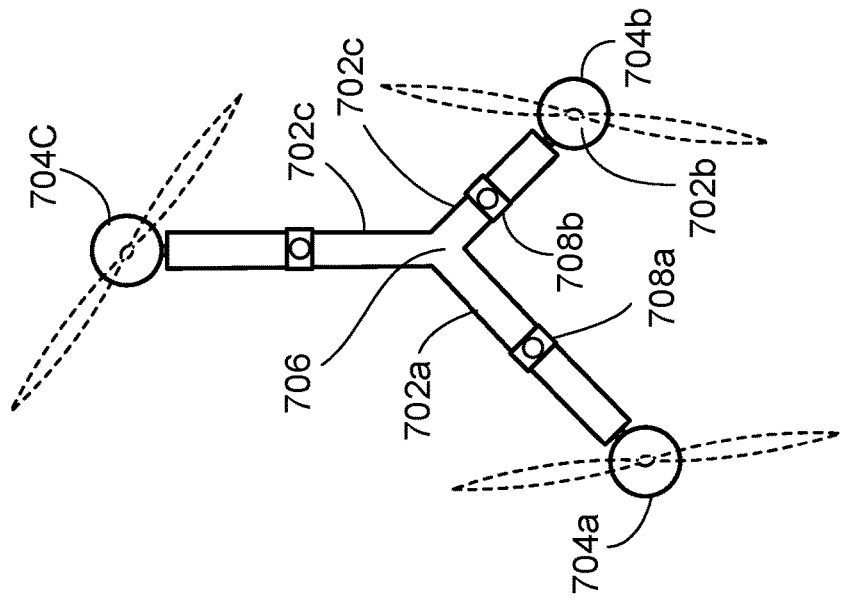
Figure 7A:
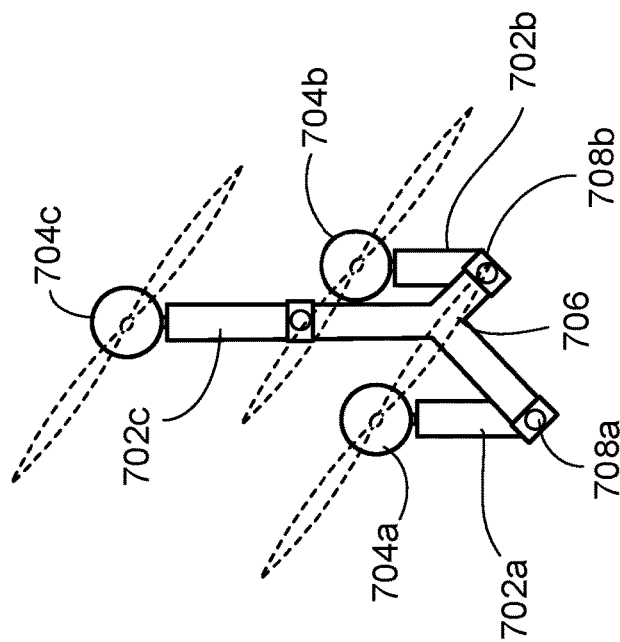

Referring to FIGS. 7A and 7B, an example UAV 700 with three rotor arms 702a, 702b, 702c has a closed configuration (FIG. 7A) and an open configuration (FIG. 7B). Each rotor arm 702a, 702b, 702c has a rotor 704a, 704b, 704c mounted on an end of the arm, sometimes referred to as the rotor end of the arm. The rotor arms 702a, 702b, 702c are connected at a central region 706. Each rotor arm 702a, 702b, 702c has an elbow 708a, 708b, 708c at which the rotor arm can be bent.

In the closed configuration (FIG. 7A), the rotor arms 702a, 702b are bent at the elbows 708a, 708b such that the outer portion of the rotor arms 702a, 702b are substantially parallel to the rotor arm 702c. In this configuration, the UAV 700 has an elongated shape such that the UAV 700 can fit into a narrow, elongated canister. To open the UAV 700 into the open configuration (FIG. 7B), the rotor arms 702a, 702b are straightened such that the rotor arms 702a, 702b are no longer bent at the elbows 708a, 708b.

Figure 8B:
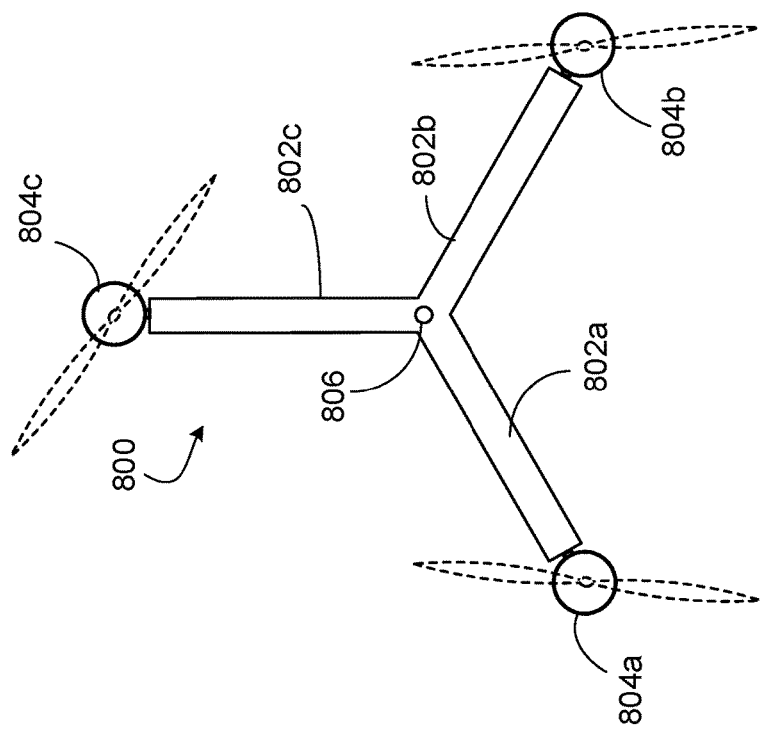
Figure 8A:
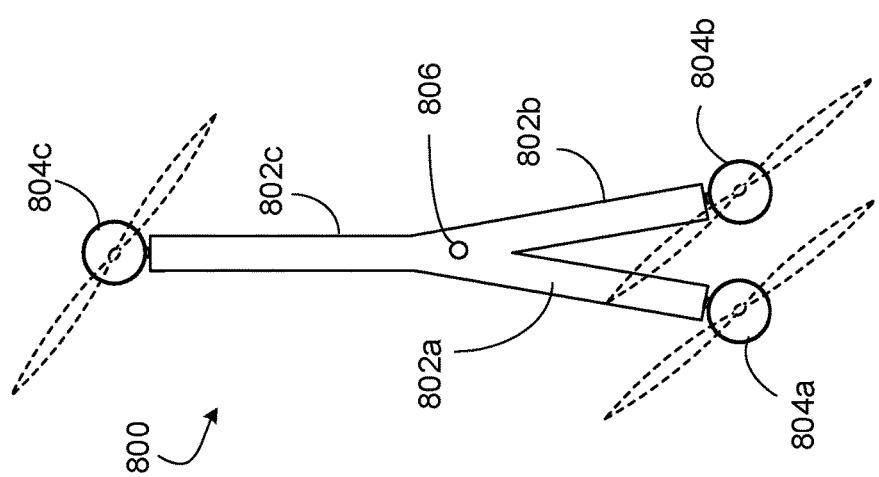
Figure 9B:
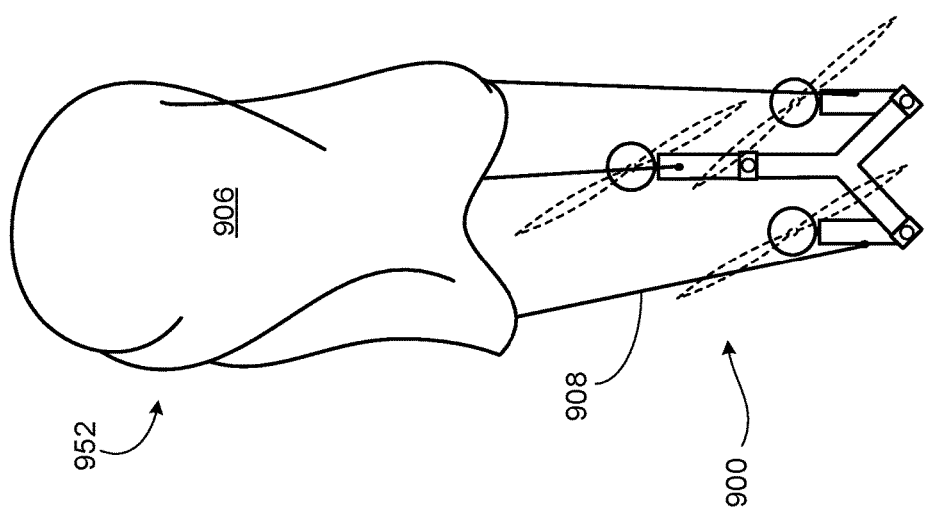
FIGS. 9A-9D are diagrams showing deployment of a UAV.
Figure 9A:
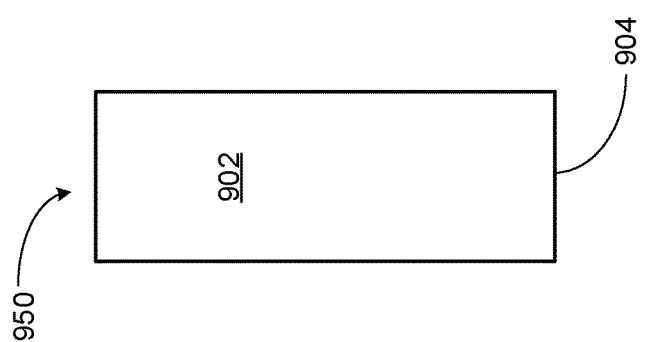
Figure 9C:
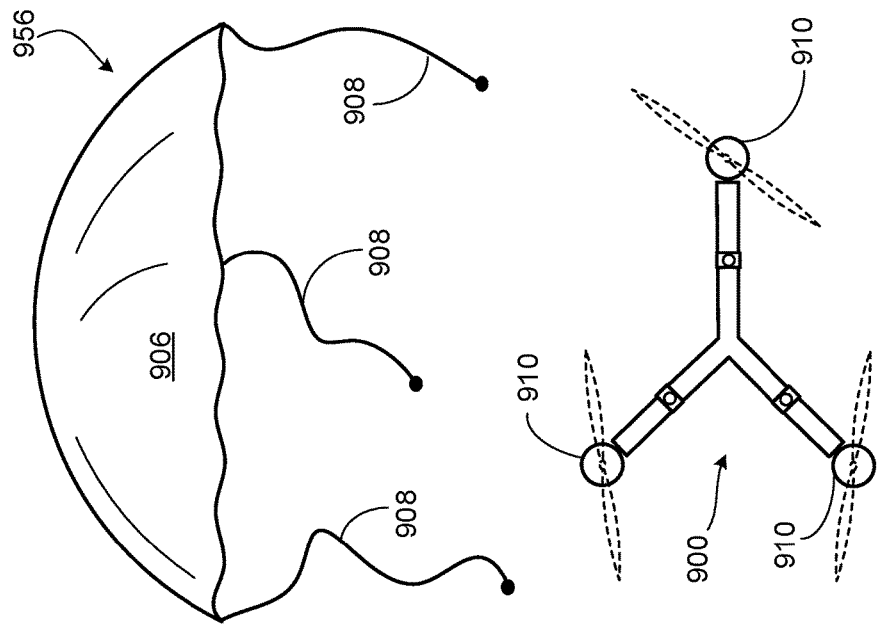
Figure 9D:
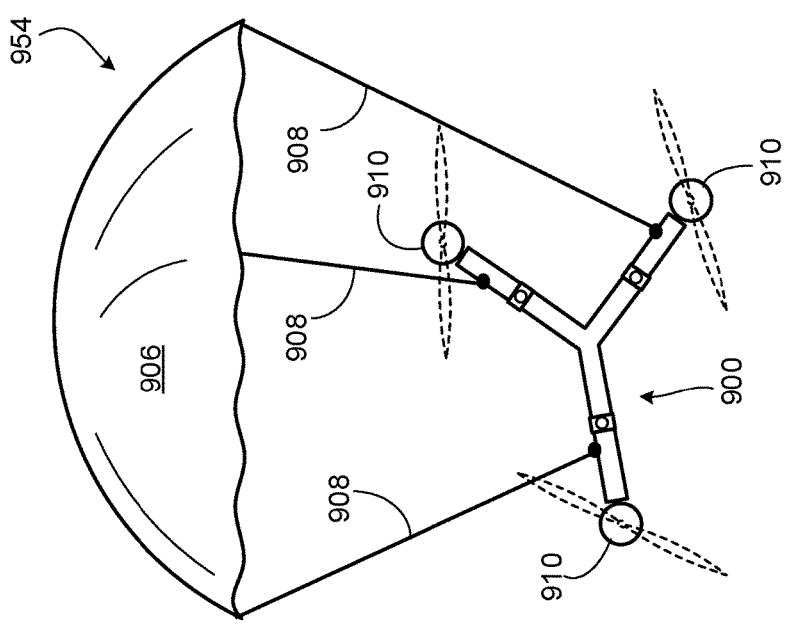

Referring to FIGS. 8A and 8B, an example UAV 800 with three rotor arms 802a, 802b, 802c has a closed configuration (FIG. 8A) and an open configuration (FIG. 8B). Each rotor arm 802a, 802b, 802c has a rotor 804a, 804b, 804c mounted on an end of the arm. The rotor arms 802a, 802b, 802c are connected at a central region that includes a pivot mechanism 806, such as a hinge, around which one or more of the rotor arms 802a, 802b, 802c can pivot. In the example of FIGS. 8A and 8B, the rotor arm 802c is stationary with respect to the pivot mechanism 806 and the rotor arms 802a, 802b can pivot around the pivot mechanism 806.

In the closed configuration (FIG. 8A), the rotor arms 802a, 802b are positioned substantially parallel to each other and are generally axially aligned with the rotor arm 802c, thus giving the closed UAV 800 an elongated shape. To open the UAV 800 into the open configuration (FIG. 8B), the rotor arms 802a, 802b are pivoted around the pivot mechanism 806 until a desired angle between the rotor arms 802a, 802b is reached. For instance, for the UAV 800 with three rotors, the rotor arms 802a, 802b are pivoted until the angle between the rotor arms 802a, 802b is about 120°. In some examples, a locking mechanism can hold the rotor arms 802a, 802b in their open position. For instance, the pivot mechanism 806 can be a one-way mechanism that prevents the rotor arms 802a, 802b from pivoting back into the closed configuration.

In general, the UAVs described here can have any mechanism that enables the UAV to transform from a closed configuration in which the UAV can fit into a narrow, elongated canister into an open configuration. For instance, one or more of the rotor arms can be configured to move relative to one or more of the other rotor arms and/or relative to a fixed central point on the UAV. The point at which a rotor arm moves relative to the other rotor arms or relative to a fixed point can be positioned at any appropriate point along the rotor arm or can be positioned at a location that is fixed, e.g., at a central region of the UAV. The rotor arms can be all the same lengths or one or more of the rotor arms can have a different length.

In some examples, the UAVs described here can be battery powered. The battery can be sized to fit within the canister but also to provide sufficient power to enable the UAV to fly to its destination and to carry out its tasks. In some examples, the battery can supply enough power for a flight time of at least about 5 minutes, at least about 10 minutes, at least about 15 minutes, at least about 30 minutes, at least about 45 minutes, at least about 60 minutes, or another flight time. In some examples, the battery can supply enough power to carry a payload of at least about 50 g, at least about 100 g, at least about 150 g, at least about 200 g, at least about 250 g, or another weight. In some examples, the battery can supply enough power to enable the UAV to fly at a speed of up to about 5 m/s, up to about 10 m/s, up to about 15 m/s, up to about 20 m/s, or another speed.

Figure 11:
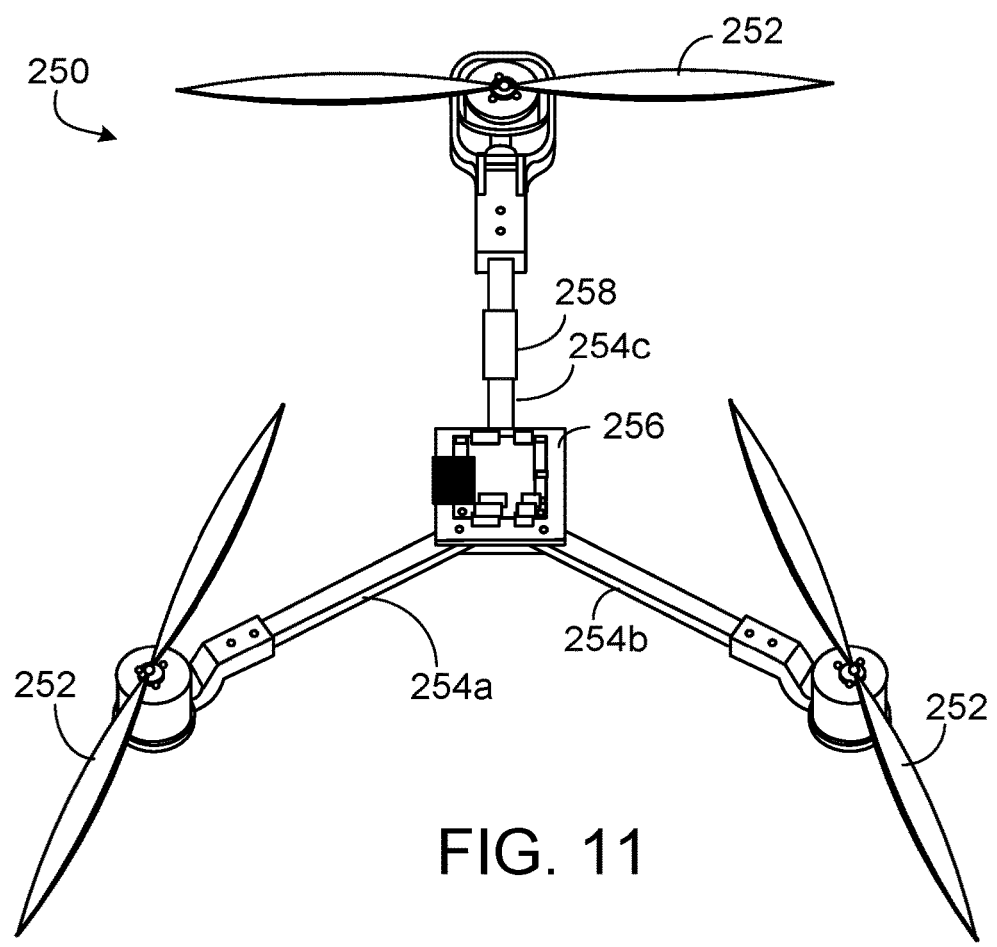
FIG. 11 is a diagram of a UAV.

In some examples, the battery can be located in the central portion of the UAV (e.g., in the central portion 206 of the UAV 200 of FIG. 2). Referring to FIG. 11, in some examples, a battery-powered UAV 250 has multiple rotor arms 254a, 254b, 254c connected to a central portion 256, with a rotor 252 mounted on the end of each rotor arm 254. A battery 258 can be disposed along one of the rotor arms 254c such that the battery 258 is structurally integrated with the rotor arm 254c.

In some examples, the UAVs described here can be powered by a micro hybrid generator system, such as described in U.S. application Ser. No. 14/942,600, filed Nov. 16, 2015, and in U.S. Provisional Application Ser. No. 62/335,938, filed May 13, 2016, the contents of both of which are incorporated here by reference in their entirety.

In some examples, the UAVs described here can have sleep and wake functions that can be used to enable the UAVs to be deployed to a destination for future use. For instance, once a UAV arrives at its destination, the UAV can enter a sleep mode to conserve battery power. At a later time, the UAV can turn on to complete its mission, such as to perform monitoring or surveillance functions or to be available for human use.

In some examples, the UAVs described here can performed multiple landings and takeoffs without human intervention. For instance, a UAV can fly to a first destination after deployment from a canister and land at that first destination, e.g., to perform a task, such as to collect measurements. The UAV can then take off from the first destination and fly to a second destination, e.g., to perform another task, such as to transmit measurement data to a computing device located at the second destination.

FIGS. 9A-9D show a schematic process for the deployment of a UAV 900 from a canister 902, such as an NCAR dropsonde. In a first stage 950, the canister 902 having a UAV 900 contained therein is released from an aircraft, such as an airplane, a balloon, or another type of aircraft. The UAV 900 is in its closed configuration when contained within the canister 902. The canister 902 can be released in a substantially vertical orientation such that a long axis of the canister is substantially parallel to the direction of downward motion of the canister. This orientation of the canister 902 can help to ensure proper release and deployment of the UAV 900.

In a second stage 952, the UAV 900 is ejected from the canister 902 in its closed configuration. For instance, the UAV 900 can be ejected from a bottom face 904 of the canister 902. In some examples, the ejection of the UAV 900 from the canister 902 can be triggered by a timer on the UAV 900. For instance, the timer can start upon release of the canister 902 from the aircraft and can be set such that ejection of the UAV 900 is triggered 5 seconds, 10 seconds, 80 seconds, 30 seconds, 60 seconds, or another amount of time after release of the canister 902 from the aircraft. In some examples, the ejection of the UAV 900 from the canister 902 can be triggered when the canister 902 reaches a target velocity or a target altitude, e.g., as measured by avionics instrumentation on the UAV 900.

In some examples, the UAV 900 is held in the canister 902 by a spring, and ejection of the UAV 900 is achieved by releasing tension in the spring, causing the UAV 900 to be pushed out of the canister 902. In some examples, the UAV 900 is held in the canister by the presence of a solid surface at the bottom face 904 of the canister, and ejection of the UAV 900 is achieved by removing the solid surface holding the UAV 900 in the canister 902.

In a third stage 954, once the UAV 900 has been ejected from the canister 902, a parachute 906 is deployed. The parachute 906 serves to slow the velocity of the UAV 900 and maintain the UAV 900 in a desired orientation, such as in an upright orientation. During or after deployment of the parachute 906, the UAV opens into its open configuration.

The parachute 906 can be attached to the UAV 900 at one or more attachment points 910 by attachment devices 908. In an example, the attachment devices 908 can be wires, such as nichrome wires. In the example shown, the UAV 900 has three rotor arms 912 and the parachute 906 is attached at one point on each of the rotor arms 912. The attachment of the parachute 906 to the UAV 900 at multiple points helps to maintain the UAV 900 in its desired orientation, such as an upright orientation, after parachute deployment. In some examples, the parachute 906 can be attached to the UAV 900 at a single, substantially central point. In some examples, the parachute 906 can be attached to the UAV 900 at multiple points on each of the rotor arms 912. The attachment devices 908 can be attached to the UAV 900 by releasable attachment mechanisms, such as a clasp, a hinge, a magnetic attachment mechanism, or another type of attachment mechanism.

In a fourth stage 956, after the UAV 900 has opened into its open configuration, the parachute 906 is detached from the UAV 900. Parachute detachment can be accomplished by releasing the attachment mechanisms, such as by opening a clasp or hinge, demagnetizing a magnet, or otherwise releasing the attachment mechanisms. In some examples, parachute detachment can be triggered by completion of the unfolding of the UAV 900. For instance, the completion of the unfolding of the UAV 900 can result in a signal being sent to a control system, e.g., a control system housed on the UAV 900. Upon receipt of the signal, the control system triggers the release of the attachment mechanisms. In some examples, parachute detachment can be triggered by a timer on the UAV 900. For instance, the timer can start upon release of the canister 902 from the aircraft or upon ejection of the UAV 900 from the canister 902, and can be set such that parachute release is triggered 1 minute, 8 minutes, 3 minutes, 5 minutes, or another amount of time after release of the canister 902 from the aircraft or after ejection of the UAV 900 from the canister 902. In an example, parachute detachment can be achieved by a blast mechanism including a load bearing member and containing a small amount of an explosive material, such as an explosive powder. When triggered, the explosive material explodes, causing the parachute to be released.

After the parachute 906 is detached from the UAV 900, rotors 910 on the UAV 900 can be activated, enabling the UAV 900 to fly and navigate independently. In some examples, the UAV 900 can be allowed to freefall for a short amount of time after parachute detachment and before the rotors 910 are activated, such as 0.5 seconds, 1 second, 8 seconds, or another amount of time, in order to reduce the risk of the parachute becoming entangled in the spinning rotors 910.

Figure 10:
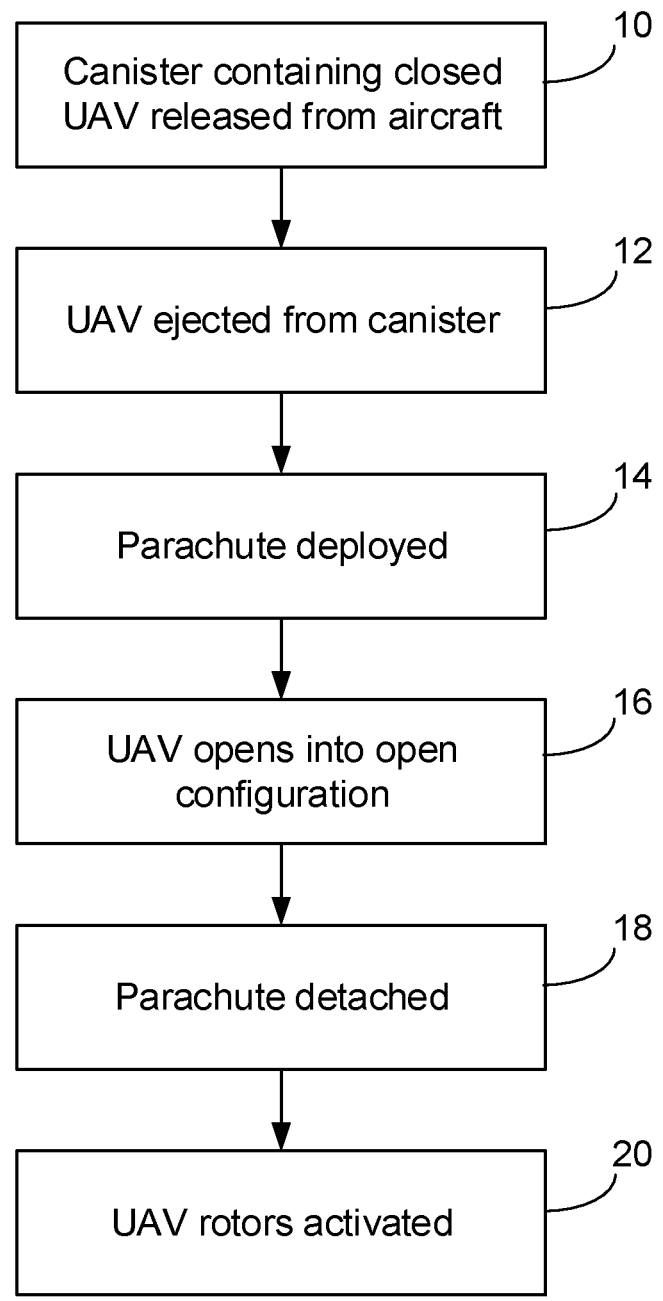
FIG. 10 is a flow chart.

Referring to FIG. 10, in a process for deploying a UAV from a canister, a canister containing a UAV in a closed configuration is released from an aircraft (10). The UAV is ejected from the canister (12). Immediately upon ejection, the UAV is still in its closed configuration. A parachute is deployed (14) to slow the descent of the UAV and to maintain the UAV in an upright orientation. The UAV opens into its open configuration (16) during or after parachute deployment. Once the UAV has opened fully, the parachute is detached (18) and the rotors on the UAV are activated (20), enabling the UAV to navigate and complete its mission tasks.

The UAVs described here can be deployed for weather monitoring or forecasting applications. For example, an NCAR dropsonde containing a UAV can be released into the center of a hurricane by a weather reconnaissance aircraft. The UAV deployed from the NCAR dropsonde can collect weather data from inside the hurricane and transmit the data to a remote destination (e.g., the weather reconnaissance aircraft or another destination) or store the data in an on-board data storage for future recovery. For instance, the UAV can be operated to collect weather data as a function of both vertical altitude and lateral position within the hurricane. Such positional data can be useful for short term forecasting of the particular hurricane and for training existing weather models or creating new weather models for improved weather forecasting capabilities.

The UAVs described here can be deployed for sensing applications, such as air quality testing, monitoring or forecasting of forest fires, monitoring of volcanic eruptions, environmental monitoring inside of a region exposed to radioactivity, or other situations in which remote monitoring or measurements can be useful. In some examples, the UAVs can collect data, such as environmental measurements, still or video images, or other data, and store the data in an on-board data storage. Later, when the UAV is recovered or returns to a base station, the data can be retrieved from the on-board data storage. In some examples, the UAVs can transmit the collected data, e.g., in real time or in batches, to a destination, such as a remote server (e.g., on the aircraft from which the UAV was released), a satellite, or another destination.

The UAVs described here can be used for security applications, such as for governmental surveillance of enemy territory, security surveillance of territory that is closed to human entry (e.g., radioactive waste disposal sites), or other security applications. The UAVs described here can be used for military applications, such as for reconnaissance in advance of troop movements, delivery of computing capability (e.g., data storage capability, data processing capability, communications capability, or other computing capabilities) to troops deployed in remote (e.g., wilderness) areas, or other military applications.

Other embodiments are within the scope of the following claims.

We claim:
1. An unmanned aerial vehicle comprising:
multiple rotor arms;
a rotor disposed at an end of each of the multiple rotor arms;

an adjustment component configured to enable a first rotor arm of the multiple rotor arms to move relative to a second rotor arm of the multiple rotor arms; and a battery forming part of one of the multiple rotor arms.

2. The unmanned aerial vehicle of claim 1, in which the first rotor arm is attached to the adjustment component, and in which the adjustment component comprises a bar configured to slide along the second rotor arm.

3. The unmanned aerial vehicle of claim 1, in which the adjustment component comprises a joint formed in the first rotor arm.

4. The unmanned aerial vehicle of claim 1, in which the adjustment component comprises a pivot point and in which the first rotor arm is configured to pivot around the pivot point.

5. The unmanned aerial vehicle of claim 1, wherein one of the multiple rotor arms has a different length than the other rotor arms.

6. The unmanned aerial vehicle of claim 1, comprising a weather sensor.

7. The unmanned aerial vehicle of claim 1, comprising a camera.

8. The unmanned aerial vehicle of claim 1, in which the adjustment component is configured to enable the unmanned aerial vehicle to take on an open configuration or a closed configuration.

9. The unmanned aerial vehicle of claim 8, in which in the closed configuration, an angle between adjacent rotor arms is less than 30°.

10. The unmanned aerial vehicle of claim 8, in which in the closed configuration, at least two of the rotor arms are positioned such that the rotors disposed at the ends of the at least two rotor arms do not have sufficient space to rotate propellers attached to the rotors.

11. The unmanned aerial vehicle of claim 8, in which in the closed configuration, the multiple rotor arms are oriented parallel to each other.

12. The unmanned aerial vehicle of claim 8, in which in the closed configuration, the unmanned aerial vehicle is sized to fit into a volume of less than about 1000 $cm^3$.

13. The unmanned aerial vehicle of claim 8, in which in the closed configuration, the unmanned aerial vehicle is sized to fit into a volume of between about 500 $cm^3$ and about 10,000 $cm^3$.

14. The unmanned aerial vehicle of claim 8, in which in the open configuration, the multiple rotor arms are extended away from each other.

15. The unmanned aerial vehicle of claim 14, in which in the open configuration, an angle between adjacent rotor arms is at least about 85°.

16. The unmanned aerial vehicle of claim 1, in which the adjustment component comprises an actuator mechanism configured to push the first rotor arm away from the second rotor arm.

17. The unmanned aerial vehicle of claim 16, wherein the actuator mechanism is configured to detach from the adjustment component when the unmanned aerial vehicle takes on an open configuration.

18. The unmanned aerial vehicle of claim 16, wherein the actuator mechanism comprises one or more of a torsion spring, an extension spring, a motor and screw, a motor and gearbox, a pneumatic device, a chemical reaction, and a parachute attachment.

19. The unmanned aerial vehicle of claim 16, wherein the actuator mechanism comprises a portion of one or more of the multiple rotor arms.

20. The unmanned aerial vehicle of claim 1, comprising a tilt mechanism configured to control one or more of an angular velocity and a translational velocity of the unmanned aerial vehicle.

21. The unmanned aerial vehicle of claim 20, in which the tilt mechanism is positioned at the end of one of the multiple rotor arms.

22. The unmanned aerial vehicle of claim 20, wherein the battery that forms part of one of the multiple rotor arms is configured to provide power to the tilt mechanism.

23. The unmanned aerial vehicle of claim 1, in which the battery acts as a power source configured to provide power to a rotor motor coupled to one or more of the rotors.

24. The unmanned aerial vehicle of claim 23, in which the power source comprises a hybrid generator system.

25. The unmanned aerial vehicle of claim 1, comprising multiple rotor motors, each rotor motor configured to power a corresponding one of the rotors.

26. The unmanned aerial vehicle of claim 25, wherein the battery that forms part of one of the multiple rotor arms is configured to provide power to the multiple rotor motors.

* * * * *